(12) United States Patent
Noh et al.

(10) Patent No.: US 9,534,284 B2
(45) Date of Patent: Jan. 3, 2017

(54) PARTIAL HEAT TREATMENT METHOD IN SALT BATH AT LOW TEMPERATURE

(71) Applicants: DK-LOK CORPORATION, Gimhae, Gyeongsangnam-Do (KR); Sam Rae Jung, Busan (KR)

(72) Inventors: Eun Sik Noh, Busan (KR); Sam Rae Jung, Busan (KR)

(73) Assignee: DK-LOK CORPORATION, Gimhae, Gyeongsangnam-Do (KR)

( * ) Notice: Subject to any disclaimer, the term of this patent is extended or adjusted under 35 U.S.C. 154(b) by 274 days.

(21) Appl. No.: 14/517,526

(22) Filed: Oct. 17, 2014

(65) Prior Publication Data

US 2015/0176113 A1    Jun. 25, 2015

(30) Foreign Application Priority Data

Oct. 22, 2013    (KR) .................. 10-2013-0125866

(51) Int. Cl.

| | | |
|---|---|---|
| *C23C 8/56* | (2006.01) | |
| *C23C 8/04* | (2006.01) | |
| *C21D 1/06* | (2006.01) | |
| *C21D 1/46* | (2006.01) | |
| *C23C 8/50* | (2006.01) | |

(52) U.S. Cl.
CPC . *C23C 8/04* (2013.01); *C21D 1/06* (2013.01); *C21D 1/46* (2013.01); *C23C 8/50* (2013.01); *C23C 8/56* (2013.01)

(58) Field of Classification Search
CPC .......... C23C 10/18; C23C 10/20; C23C 10/24; C23C 10/56
See application file for complete search history.

(56) References Cited

U.S. PATENT DOCUMENTS 3,864,221 A * 2/1975 Ramqvist ................ C25D 3/66
205/178

FOREIGN PATENT DOCUMENTS

| KR | 10-2001-0072424 A | 7/2001 |
|---|---|---|
| KR | 10-0812971 B1 | 3/2008 |

* cited by examiner

*Primary Examiner* — Jessee Roe
(74) *Attorney, Agent, or Firm* — Locke Lord LLP; Christopher J. Capelli; Daniel J. Fiorello

(57) ABSTRACT

This invention relates to a surface heat treatment method in a salt bath at low temperature, suitable for partially hardening the surface of a workpiece through heat treatment, including plating the surface of a workpiece with a first metal layer; partially peeling the first metal layer; heat treating the workpiece at a temperature of 400 to 500° C. for a predetermined period of time; and totally peeling the first metal layer. Thereby, low-temperature heat treatment is effective at heat treating the workpiece while minimizing deterioration of corrosion resistance.

10 Claims, 9 Drawing Sheets

PARTIAL HEAT TREATMENT METHOD IN SALT BATH AT LOW TEMPERATURE

CROSS-REFERENCE TO RELATED APPLICATION

This application claims the benefit of Korean Patent Application No. 10-2013-0125866, filed on Oct. 22, 2013, which is hereby incorporated by reference in its entirety into this application.

BACKGROUND OF THE INVENTION

1. Technical Field

The present invention relates to a partial heat treatment method in a salt bath at low temperature, and more particularly, to a partial heat treatment method in a salt bath at low temperature, wherein heat treatment which enables a specific metal to penetrate to the surface of a workpiece to thus increase surface hardness is performed by an immersion process in a molten salt solution at low temperature, thereby preventing corrosion resistance from deteriorating.

2. Description of the Related Art

Heat treatment is widely utilized to enhance surface hardness of a workpiece. Typically, heat treatment is performed by bringing a workpiece into contact with a gas or molten salt solution for carburizing or nitriding at high temperature to thus diffuse the carbon or nitrogen atoms to the surface of the workpiece.

Heat treatment using a salt may be used to increase hardness of a metal having high corrosion resistance such as iron (stainless steel) containing chromium. An increase in hardness is achieved via formation of a nitride precipitate or a carbide precipitate abbreviated to "nitride" or "carbide".

As such, a nitride or carbide is configured such that chromium is precipitated with respect to nitrogen or carbon. When a non-uniform surface structure is formed through precipitation in this way, a difference in electronegativity may occur between a portion where chromium is lacking due to removal of chromium and a portion where chromium is precipitated. Such a difference allows for action as a kind of galvanic cell, and thus a metal product may easily corrode. The precipitation easily takes place when the same element as in the precipitate is present in a large amount in the workpiece or it is easy to permeate particles due to high heat treatment temperature.

Although a workpiece needs to be totally hardened, a part such as a ferrule is required to have high hardness only on a portion thereof.

Figure 1A:
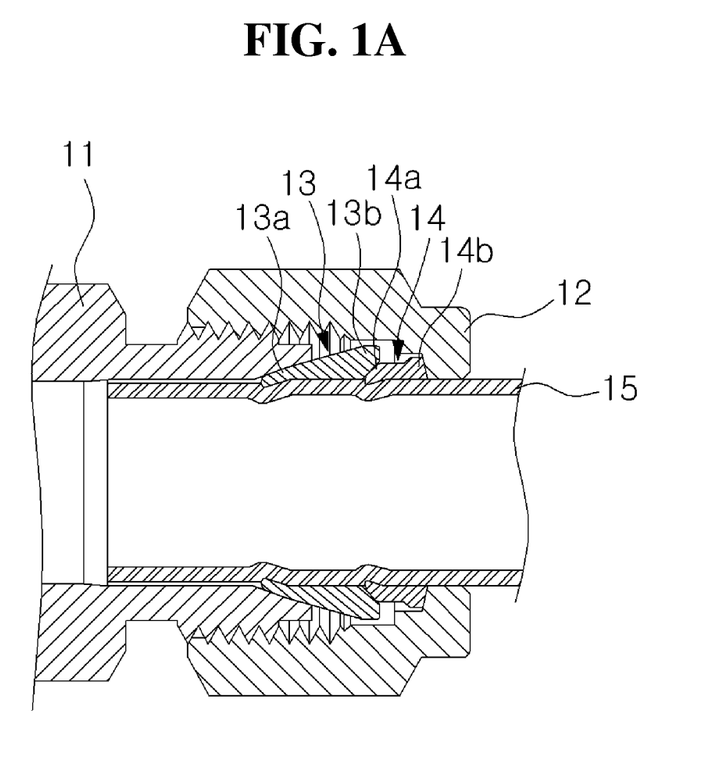
FIGS. 1A and 1B are a cross-sectional view and a perspective view, respectively, illustrating a ferrule having a predetermined shape used to connect two pipes.
Figure 1B:
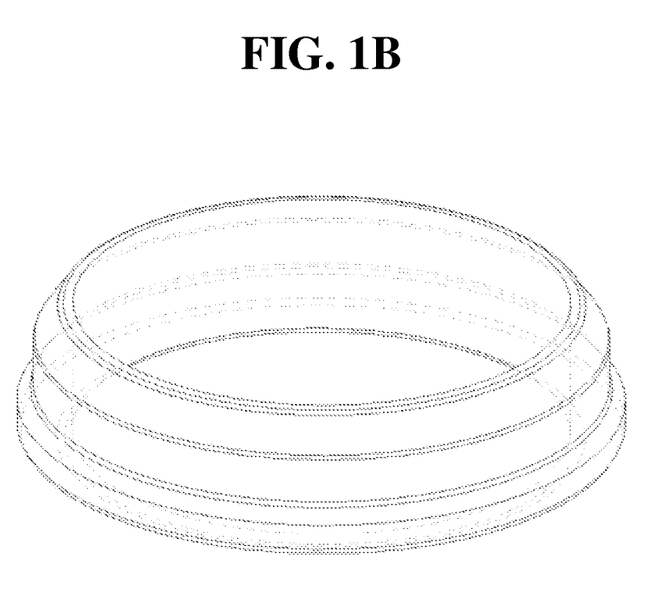

FIGS. 1A and 1B are a cross-sectional view and a perspective view, respectively, illustrating a ferrule having a predetermined shape used to connect two pipes.

FIG. 1A is a cross-sectional view illustrating the connection structure of two pipes using a ferrule.

When the two pipes, for example, a front pipe 11 and a rear pipe 15 are connected, the ferrule functions to close a gap between the front pipe 11 and the rear pipe 15 and is responsible for swaging the pipes to ensure a sealing function and for preventing separation of the pipes.

The ferrule may include a front ferrule 13 and a back ferrule 14.

The back ferrule 14 plays a role in that while the rear (tail portion 14b) of the back ferrule 14 is pushed by a nut 12 for tightening the pipes, a force is transferred to the front ferrule 13. As such, while the nut 12 rotates, it tightens the pipes, and thus rotational torque is created. The back ferrule 14 performs a linear motion in the travel direction of the nut 12 when the nut 12 is moved forward while rotating.

By the back ferrule 14, the lower beveled portion of the rear of the front ferrule 13 is lifted up, and a nose portion 14a swages the pipes to thereby prevent the separation of the pipes.

Accordingly, desired purposes may be achieved only when the hardness of the nose portion of the back ferrule 14 is high. If the entire back ferrule 14 has high hardness, rotational torque of the nut 12 is not efficiently absorbed, thus increasing brittleness. Thus, only the nose portion 14a of the back ferrule 14 has to be selectively hardened.

FIG. 1B is a perspective view illustrating the ferrule. The ferrule is ring-shaped and the nose portion thereof is transformed by a force applied to the front while being twisted from the back. Hence, the nose portion needs to be particularly hardened.

The front ferrule 13 includes a support portion 13b to which pressure is applied while the nut 12 is tightened, and a nose portion 13a which receives the applied pressure and thus undergoes irreversible transformation and closes and swages the edge of the pipe. As high friction and force are applied in the course of transformation, the nose portion 13a has to possess high hardness and elasticity. The parts that selectively require high hardness on a predetermined portion, such as the ferrules 13, 14, should undergo selective partial hardening treatment.

When high hardness is required only on a predetermined portion in this way, such a portion is hardened through partial heat treatment. Typically, a partial heat treatment method includes plating a workpiece with a different kind of metal, wherein the resulting plating is used as a mask against heat treatment. Specifically, the workpiece is plated with a different kind of metal, and the plating is removed from a portion to be hardened, so that the surface of the workpiece is externally exposed. Then, heat treatment is performed, and thereby the portion which is not externally exposed blocks permeation of nitrogen or carbon due to the plating, and thus precipitation does not easily occur. Consequently, only the exposed portion is selectively hardened.

However, upon long-term heat treatment at high temperature while carrying out partial hardening through such a plating process, chromium is excessively precipitated on the portion which undergoes partial heat treatment, undesirably deteriorating corrosion resistance.

SUMMARY OF THE INVENTION

Accordingly, an object of the present invention is to provide a partial heat treatment method, wherein corrosion resistance may be prevented from deteriorating during heat treatment using an immersion process in a molten salt solution at low temperature.

In order to accomplish the above object, an aspect of the present invention provides a low-temperature salt bath heat treatment method, suitable for partially hardening the surface of a workpiece through heat treatment, including plating the surface of a workpiece with a first metal layer; partially peeling the first metal layer; heat treating the workpiece at a temperature of 400 to 500° C. for a predetermined period of time; and totally peeling the first metal layer.

The metal for the first metal layer may have a different structure from that of the workpiece, so that it is peeled without leaving any residue.

The first metal layer may include any one or more selected from among copper, chromium, nickel and tin.

Also, the heat treatment may be salt bath heat treatment comprising immersing the workpiece in a molten salt solution.

The molten salt solution may be a molten salt solution including sodium, potassium, lithium, nitrogen and a nitrogen compound.

As such, the heat treatment may be nitriding treatment.

The first metal layer may have a thickness ranging from 15 μm to 50 μm.

The predetermined period of time may range from 24 hr to less than 48 hr.

The workpiece may be a ferrule for sealing a gap between pipes to be connected.

The ferrule may include a nose portion for sealing the pipes through irreversible transformation, and the surface of the nose portion may be exposed upon partial peeling.

Another aspect of the present invention provides a partial heat treatment method in a salt bath at low temperature, suitable for use in hardening the surface of a ferrule through heat treatment, including plating the surface of a ferrule with a first metal layer; partially peeling the first metal layer, thus exposing a portion of the surface of the ferrule; heat treating the workpiece at a temperature of 400 to 500° C. to harden the surface of the workpiece; and totally peeling the first metal layer remaining on the surface of the workpiece.

The first metal layer may include any one or more selected from among copper, chromium, nickel and tin.

Also, the heat treatment may comprise immersing the workpiece in a molten solution of an alkali salt including a nitrogen and carbon compound.

A further aspect of the present invention provides a partial heat treatment method in a salt bath at low temperature, including primarily plating the surface of a workpiece with a first metal layer; secondarily plating the surface of the first metal layer with a second metal layer; partially peeling the first and the second metal layer, thus exposing a portion of the surface of the workpiece; heat treating the workpiece at a temperature of 400 to 500° C. to harden the exposed surface of the workpiece; and totally peeling the first and the second metal layer remaining on the surface of the workpiece.

The second metal layer may include any one of iron, nickel, chromium and tin, or an alloy thereof.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of preferred embodiments of the present invention with reference to the appended drawings. Throughout the drawings, it is noted that the same reference numerals are used to refer to the same or similar elements. As such, the constructions and functions of the present invention depicted in the graphs and photographs of the drawings and described thereby may correspond to at least one embodiment, but are not construed as limiting the present invention.

According to an embodiment of the present invention, a partial heat treatment method in a salt bath at low temperature includes plating the upper side of a workpiece with a first metal layer 310, peeling a portion of the workpiece to be heat treated, and immersing the workpiece in a molten salt solution at low temperature, thus achieving partial heat treatment in a salt bath.

Typically, heat treatment is performed in such a manner that the surface of a workpiece is heat treated to a temperature of 600° C. or more. As such, the surface of the workpiece is recrystallized due to high heat. When the heat treatment temperature is high, rapid recrystallization occurs, so that chromium is precipitated non-uniformly in an excessively large size. When chromium is non-uniformly precipitated in this way, electronegativity may vary depending on the concentration of chromium, undesirably deteriorating corrosion resistance.

However, when heat treatment is carried out at low temperature for a long period of time, precipitation of chromium occurs limitedly, and thus chromium is uniformly precipitated. Therefore, hardness may increase, and deterioration of corrosion resistance may decrease. This indicates that both high corrosion resistance and high hardness may be obtained.

Upon long-term heat treatment, the first metal layer 310 may be modified and thus may not properly shield the heat treatment. To prevent this, a second metal layer 410 is further plated on the first metal layer 310, thus improving the shielding effect.

Also, the heat treatment time may fall in the range from 24 hr to 48 hr. A period of time required for significant hardening at a temperature of 500° C. or less is about 15 hr.

In actual processes, however, the hardening time is preferably 24 hr. If it exceeds 48 hr, corrosion resistance may deteriorate, and thus the low heat treatment temperature effect (corrosion resistance maintenance) may become insignificant. Hence, the heat treatment time is set to the range of 24 to 48 hr.

Figure 2:
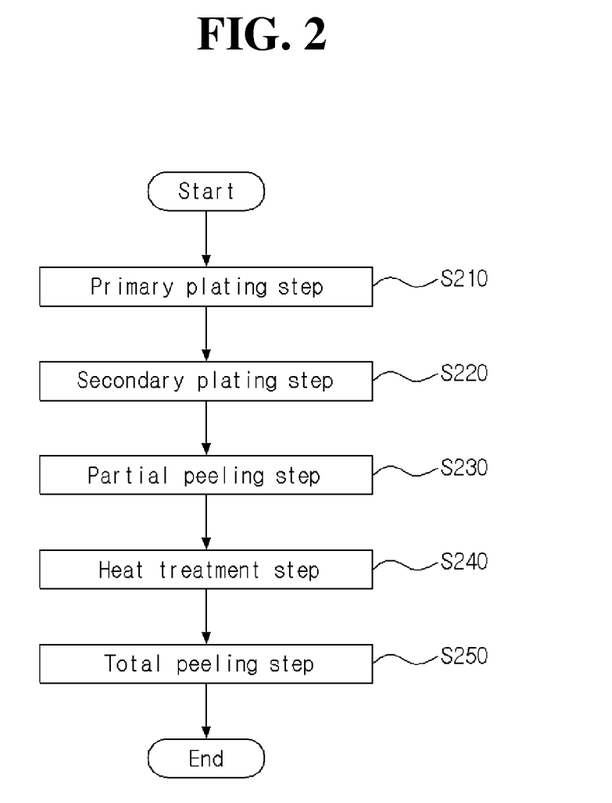
FIG. 2 is a flowchart illustrating processing of a workpiece according to an embodiment of the present invention.

FIG. 2 is a flowchart illustrating processing of a workpiece according to an embodiment of the present invention. Although double plating and heat treatment are illustrated in FIG. 2 in the embodiment of the invention, single plating and heat treatment may be applied.

When heat treatment is carried out at low temperature, it requires a longer period of time, thus causing damage to the plating layer. Hence, double plating is implemented to decrease the deterioration of corrosion resistance upon heat treatment, which is illustratively described below.

In the primary plating step (S210), the surface of a workpiece is plated with a first metal layer.

To this end, any plating process may be applied, but electroplating is appropriate because the plating region has to be free of voids.

The subsequent process may include peeling the plating. If any residue is left behind even after peeling of the plating, the portion where the plating residue is present is not heat treated.

Therefore, the first metal layer preferably includes a metal which may be peeled off without leaving any residue. To this end, the metal for the first metal layer has to possess a different structure from a workpiece which is a metal to be plated so that no mutual penetration occurs at the boundary therebetween.

That is, a metal in which the boundary between the surface of the workpiece and the plated first metal layer is unclear is improper for use in the first metal layer.

Furthermore, the first metal layer has to have high corrosion resistance so that it does not corrode upon penetration of carbon or nitrogen but may block carbon or nitrogen under high heat conditions. In an embodiment of the present invention, the plating metal is copper. The use of copper for the first metal layer is described in the embodiment of the invention. However, the first metal layer may include tin, chromium or nickel or an alloy thereof, which may prevent nitrification of a workpiece.

The thickness of the first metal layer is preferably in the range from about 15 μm to within 50 μm. As such, 15 μm is a thickness able to prevent permeation of a penetration material and to maintain a uniform thickness, and 50 μm is a thickness which facilitates the subsequent peeling.

In the secondary plating step (S220), the surface of the first metal layer is plated with a second metal layer.

The second metal layer has a denser structure than the first metal layer, and should be thus finely plated on the sparse portion (high energy portion) of the first metal layer. When the first metal layer is made of copper, any composition for the second metal layer having a more compact and denser structure than copper may be provided. Furthermore, a metal such as chromium, nickel, tin or iron, and an alloy of two or more thereof may be used therefor. As such, if the first and the second metal layer are made of the same metal, this merely means that the first metal layer is thickly plated via two plating processes. Hence, the first and the second metal layer are preferably made of metals different from each other.

The first and the second metal layer are plated to a thickness of at least 15 μm so as to prevent permeation of the salt for a long period of time at high temperature.

Also, when the first and the second metal layer 310, 410 are peeled by immersing the workpiece in a solvent, the first and the second metal layer 310, 410 should be completely removed within a short peeling time period such that the workpiece is not damaged. Accordingly, the first and the second metal layer 310, 410 should be plated to be sufficiently thin (a thickness of 50 μm or less).

In the partial peeling step (S230), the first and the second metal layer 310, 410 are partially peeled from the workpiece, thus exposing a portion of the surface of the workpiece. The predetermined region of the workpiece is a portion that requires high hardness. For a back ferrule 14, it may be a nose portion 14a that comes into close contact with the surface of a pipe through irreversible transformation.

Any peeling process may be employed so long as no residue is left behind and only the metal layer is dissolved without damage to the workpiece.

The plating at a specific portion may be removed using an immersion process in a solvent for dissolving a metal layer. When a solvent able to dissolve both of the two metal layers is provided, such layers may be removed simultaneously via the immersion process in the solvent. Also, when different kinds of solvents are provided to dissolve the two plated metal layers, an outer plating and an inner plating may be sequentially removed by being immersed in a solvent for dissolving the outer plating and then in a solvent for dissolving the inner plating. When the first metal layer is copper, the solvent for dissolving the first metal layer may be nitric acid, and when the second metal layer is chromium, the solvent for dissolving the second metal layer may be hydrochloric acid.

When the first metal layer 310 is plated alone, it may be fully removed by being immersed in a solvent able to peel a first metal layer 310.

In the heat treatment step (S240), the workpiece is heat treated. As such, the heat treatment method may be salt bath heat treatment. For the salt bath heat treatment, the workpiece is heat treated using an immersion process in a molten salt solution at high temperature. As such, depending on the kind of molten salt solution, the component that penetrates into the surface of the workpiece during the heat treatment is determined.

As such, salt bath heat treatment may be carried out using a salt including carbon or nitrogen. When salt bath heat treatment (carburizing treatment) is performed using a salt including carbon, carbon penetrates to the workpiece and thus recrystallization occurs; and when salt bath heat treatment (nitriding treatment) is conducted using a salt including nitrogen, nitrogen penetrates to the workpiece and thus recrystallization takes place. Moreover, the salt may include an alkali to increase surface reactivity of the workpiece.

The heat treatment temperature determines the penetration depth and rate of the component that penetrates into the surface of the workpiece. That is, when the heat treatment temperature is high, the penetration component may more rapidly and deeply penetrate into the surface.

However, when the heat treatment temperature is high, the component (especially chromium) contained in the workpiece is recrystallized, so that the workpiece is converted into a non-uniform structure. When the structure is converted in this way, non-uniformity may cause a difference in electronegativity to thus produce a kind of galvanic cell, and thereby corrosion resistance may significantly deteriorate. Hence, heat treatment is carried out not at high temperature but at low temperature for a long period of time, so that the penetration material may uniformly penetrate to the inside of the workpiece, thereby uniformly and rigidly modifying the surface structure. In this case, the deterioration of corrosion resistance is limited.

As such, the low temperature may be a temperature ranging from 400° C. to 500° C. at which the precipitation is minimized, and the long period of time may be 15 hr or more from which the workpiece begins to be significantly hardened.

Applying the high temperature is performed over the entire workpiece, and the penetration component penetrates throughout the workpiece. However, the penetration component does not come into direct contact with the surface of the workpiece at the plated portion, and thus does not penetrate. That is, it is difficult to modify the surface of the workpiece through heat treatment.

Even in the presence of the plated portion, when the metal layer is too thin or is not dense or the penetration component permeates into the metal layer due to the long-term heat treatment, penetration therethrough occurs and recrystallization is thus carried out, ultimately deteriorating corrosion resistance. When the salt bath heat treatment is carried out at low temperature for a long period of time, many kinds of plating metals may corrode and thus cannot shield the heat treatment.

Accordingly, a secondary plating process is performed on the first metal layer 310 to form a layer having a dense structure, thus preventing permeation of the penetration component. In general, double plating with two layers having different structures is not performed because the plating thickness is not uniform.

However, when a secondary plating process is implemented to strengthen the portion where the first plating is not hard, there is no need to form a uniform plating thickness. As the portion where the first plating is not hard is strengthened with the second plating, a total uniform electronegativity may result.

Thus, the first metal layer may include copper having corrosion resistance and high peelability, and the second metal layer may include any one of iron, nickel, chromium and tin or an alloy thereof, having a denser structure than the first metal layer.

As such, heat treatment may not be necessarily carried out by the immersion process in the molten salt solution, and the penetration material may be applied in the form of a gas or aerosol at high temperature onto the surface of the workpiece. However, the salt bath heat treatment may cause uniform surface modification, desirably resulting in a high-quality product. Also, upon heat treatment at low temperature, the penetration material may slowly penetrate. Compared to carbon, nitrogen may rapidly penetrate to the surface of a workpiece. In an embodiment of the present invention, the salt bath heat treatment may be nitriding heat treatment. The nitriding heat treatment may include heat treatment under the condition that the partial pressure of nitrogen is high, and immersion in a molten salt solution including nitrogen oxide or a nitrogen and carbon compound enables more uniform and rapid hardening.

In the total peeling step (S250), the first and the second metal layer, which remain, are peeled off. As in the partial peeling step, the remaining metal layers may be peeled using the solvent. After completion of the peeling, whether the metal layers are left behind or not may be checked. Because corrosion resistance may deteriorate due to the hardening through heat treatment, when the chemical process is regarded as inappropriate, peeling may be performed using a physical process. Thus, it is possible to physically remove the metal layer using polishing.

In the present invention, the secondary plating step (S220) may be omitted. As such, the portion of the first metal layer 310 plated on the workpiece is peeled in the partial peeling step (S230), thus partially exposing the surface of the workpiece.

The partial hardening process on the workpiece requiring partial hardening is as described above. With reference to FIGS. 3 to 7, when the workpiece is a ferrule, intermediate products at individual steps in the partial hardening process are described below.

Figure 3:
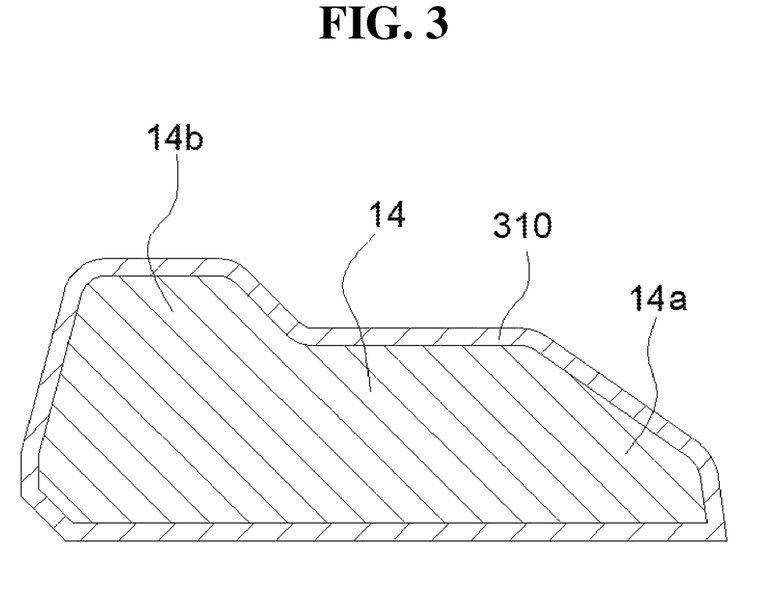
FIG. 3 is a cross-sectional view illustrating a primarily plated ferrule according to an embodiment of the present invention.

FIG. 3 is a cross-sectional view illustrating a primarily plated ferrule according to an embodiment of the present invention.

A back ferrule 14 includes a tail portion 14b for supporting the pressure of the rear thereof and a nose portion 14a connected to the tail portion 14b and configured to seal the pipes through irreversible transformation by pressure applied from the tail portion 14b. For selective heat treatment, it is difficult to plate the portion other than the nose portion 14a so as to expose only the nose portion 14a of the back ferrule 14. Therefore, the entire back ferrule 14 is first plated and then the portion corresponding to the nose portion 14a is selectively peeled. In the primary plating step, the entire back ferrule 14 is plated with the first metal layer. The first metal layer 310 has an element different from the composition of the back ferrule 14 so as to be easily separated through chemical or physical treatment from the surface of the workpiece. For example, in a stainless steel back ferrule 14, the first metal layer 310 may include copper, or any one of chromium, nickel and tin or an alloy thereof. The lower limit of the thickness of the first metal layer 310 may be 15 μm so that the surface of the back ferrule is thoroughly plated therewith and the back ferrule 14 is protected from an external material, whereas the upper limit thereof may be 50 μm so that no residue is left behind upon chemical peeling. The plating process may be electroplating, but any process may be used so long as the surface of the workpiece is thoroughly plated.

Figure 4:
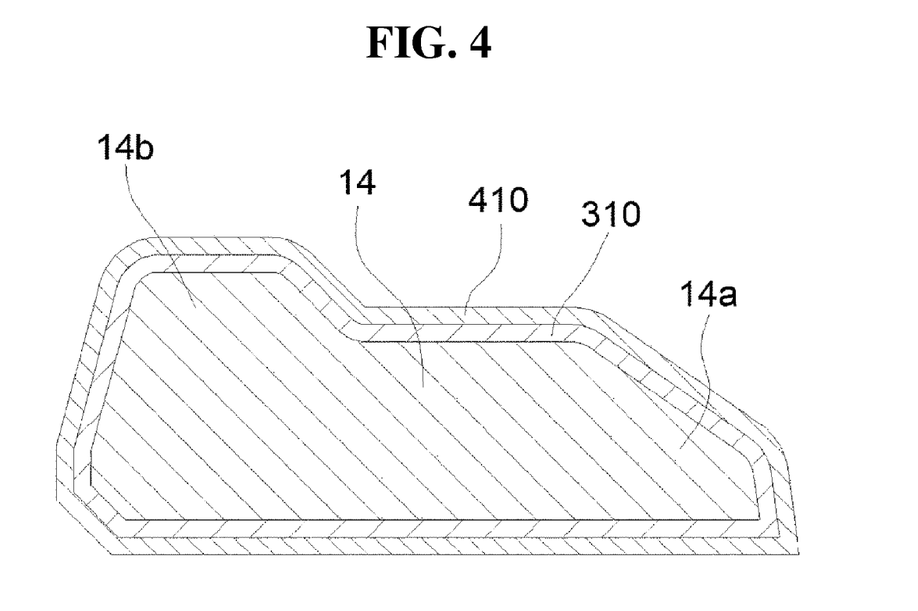
FIG. 4 is a cross-sectional view illustrating a secondarily plated ferrule according to an embodiment of the present invention.

FIG. 4 is a cross-sectional view illustrating a secondarily plated ferrule according to an embodiment of the present invention.

In the secondary plating step, the second metal layer is plated on the first metal layer produced in the primary plating step. During the long-term heat treatment in the presence of only the first metal layer, nitrogen and carbon may penetrate therein. Hence, the second metal layer 410 having a denser structure than the first metal layer 310 is secondarily plated. Since the first and the second metal layer 310, 410 have different structure densities, it is difficult to achieve uniform plating. However, in an electroplating process, the second metal layer 410 is thickly plated on the portion where the first metal layer 310 is thinly plated and thus resistance is low. Therefore, the sparse portion of the first metal layer 310 may be strengthened with the second metal layer. To this end, non-uniform plating may be more suitable, rather than uniform plating. Although the electroplating process may be applied, any process may be utilized so long as the corresponding surface is thoroughly plated.

The second metal layer 410 may include iron, nickel, chromium, tin or an alloy thereof, which is dense and resistant to salt compared to copper. The second metal layer may include the same kind of metal as in the first metal layer, but the use of a different metal is preferable. The lower limit of the thickness of the second metal layer 410 may be 15 μm so that the surface of the back ferrule is thoroughly plated therewith and the back ferrule 14 is protected from an external material, whereas the upper limit thereof may be 50 μm so that no reside is left behind upon chemical peeling.

The secondary plating step may be omitted, as necessary.

Figure 5:
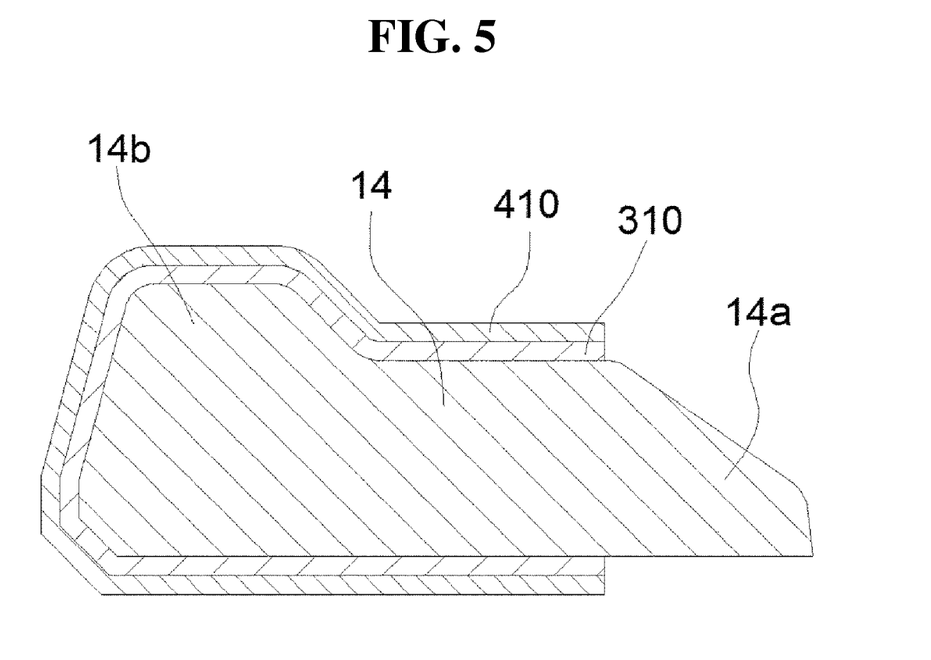
FIG. 5 is a cross-sectional view illustrating a partially peeled ferrule according to an embodiment of the present invention.

FIG. 5 is a cross-sectional view illustrating a partially peeled ferrule according to an embodiment of the present invention.

After completion of the secondary plating step, the plating is removed from the region corresponding to the nose portion 14a. The removal process may include immersion of the portion corresponding to the nose portion 14a in a solvent able to dissolve the corresponding metal layer. For example, copper is dissolved in nitric acid, and iron, nickel, chromium or tin may be dissolved in hydrochloric acid, and thus the region corresponding to the nose portion 14a of the secondarily plated back ferrule 14 is sequentially immersed in hydrochloric acid and nitric acid, or in a mixture of hydrochloric acid and nitric acid, thereby removing the plating at a specific portion.

When the secondary plating step is omitted, only the first plating layer 310 corresponding to the nose portion is peeled upon partial peeling.

Figure 6A:
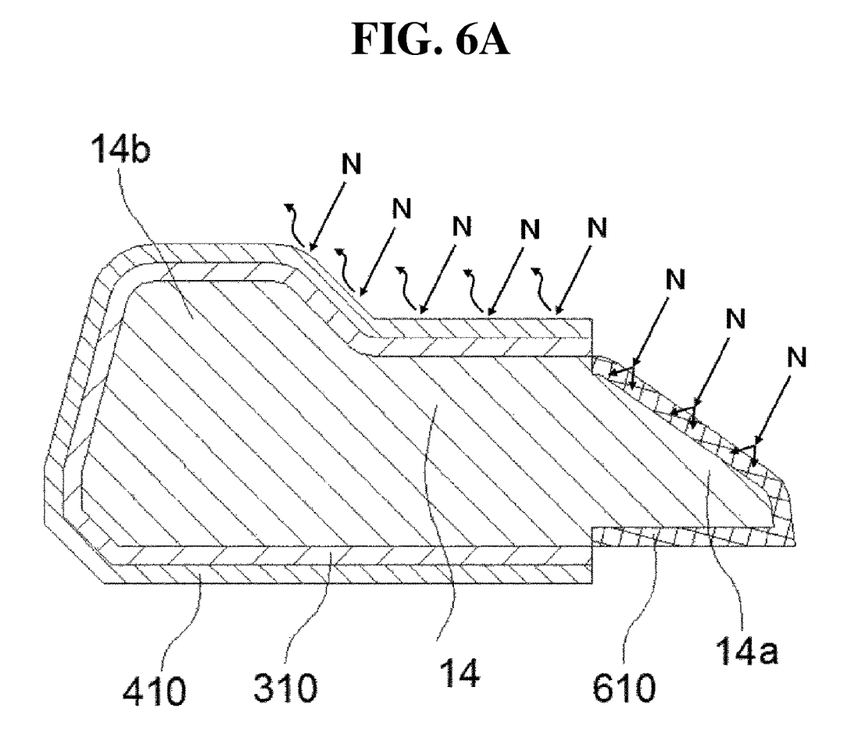
FIGS. 6A and 6B are schematic views illustrating the extent of penetration in the presence or absence of a plating upon nitriding or carburizing according to an embodiment of the present invention.
Figure 6B:
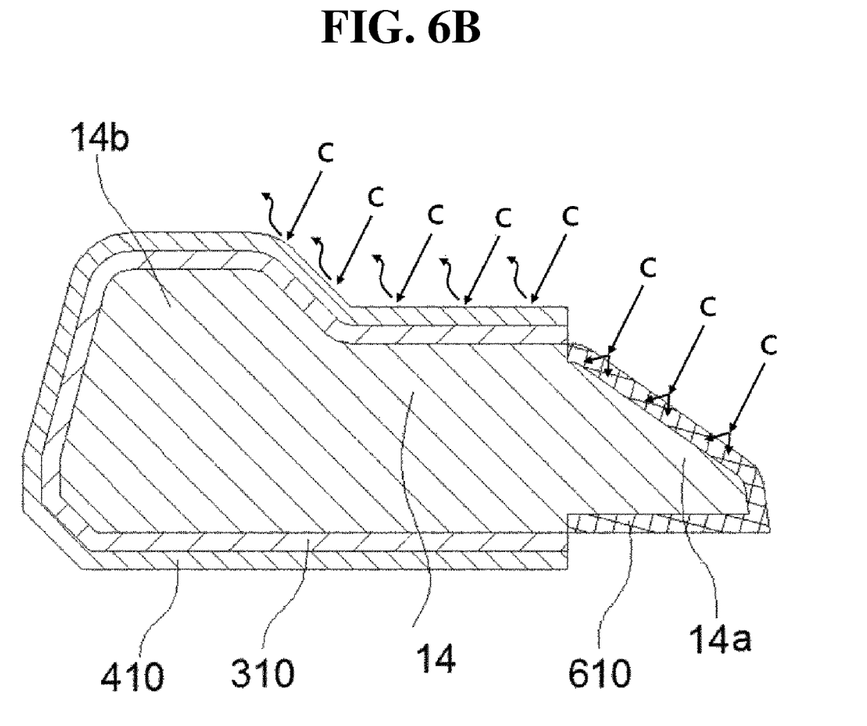

FIGS. 6A and 6B schematically illustrate the extent of penetration in the presence or absence of the plating upon nitriding or carburizing according to an embodiment of the present invention.

As illustrated in FIG. 6A, nitrogen penetrates to the nose portion 14a at which the surface of the back ferrule 14 is exposed upon nitriding, so that the penetrated surface 610 may be modified, thereby increasing hardness. On the other hand, nitrogen does not penetrate to the tail portion 14b plated with two layers, so that no modification occurs. FIG. 6B schematically illustrates the extent of penetration of carbon at different positions upon carburizing.

The heat treatment may be salt bath treatment. As such, the salt may be a molten salt including an alkali metal and a nitrogen and carbon compound. Accordingly, the salt bath treatment may be nitriding treatment. Also, the salt may be a molten salt including an alkali metal and a carbon compound. Therefore, the salt bath treatment may be carburizing treatment.

When the heat treatment temperature is high, chromium may be recrystallized by the high temperature treatment alone. Hence, the heat treatment temperature may be appropriately set to 500° C. or less. When the heat treatment temperature is lowered, the penetration rate of nitrogen or carbon may decrease, making it possible to implement long-term heat treatment. As such, the heat treatment time may range from 24 hr to within 48 hr.

Figure 7:
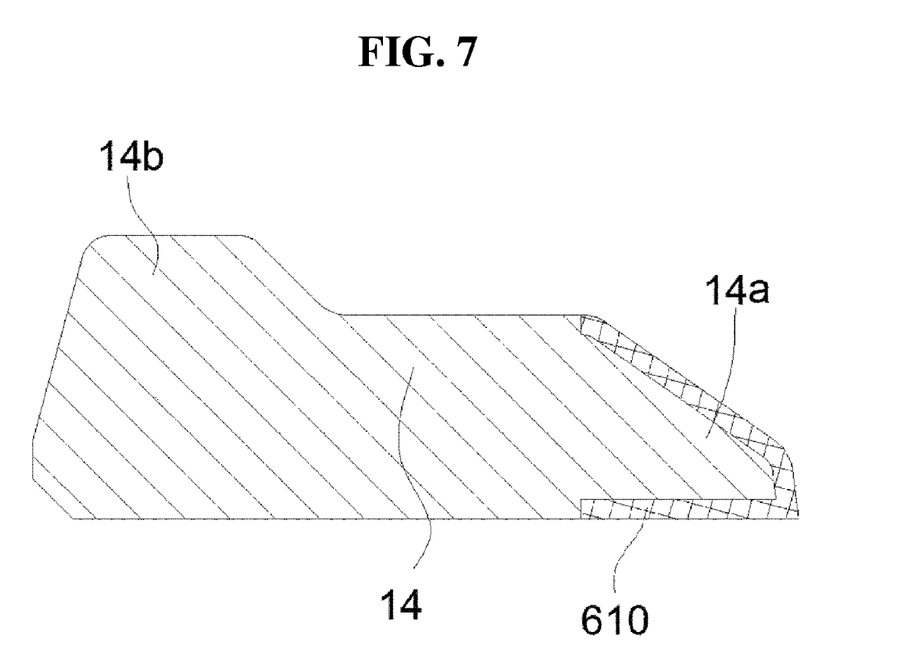
FIG. 7 is a cross-sectional view illustrating a ferrule from which the plating was removed according to an embodiment of the present invention.

FIG. 7 is a cross-sectional view illustrating a ferrule from which the plating was removed according to an embodiment of the present invention.

After completion of the heat treatment, the salt is removed and cooling may be implemented. The second 410 and the first metal layer 310, covering the tail portion 14b, are sequentially dissolved in the solvents and thus removed, thereby obtaining a back ferrule 14 in which only the nose portion 14a is hardened.

When the second metal layer 410 is not provided, the first metal layer 310 may be dissolved in a solvent to thus be removed.

A metal having corrosion resistance, such as stainless steel, may have an oxide film on the surface thereof to protect the metal. Accordingly, the back ferrule 14 or the workpiece has to be free of an oxide film by being immersed in an alkali metal salt or an acidic salt immediately before heat treatment. In the heat treatment step, the molten salt solution typically includes an alkali metal, but there is no essential need to use the molten salt solution containing an alkali metal salt, so long as the film may be removed through physical peeling or using a reductant instead of the alkali metal.

As mentioned above, the workpiece requiring partial hardening is exemplified by the back ferrule 14. In addition thereto, a front ferrule 13 also needs partial hardening as described in the [Description of the Related Art]. Therefore, the present invention will be able to be applied to a general ferrule or a workpiece that should have corrosion resistance and high hardness at a specific portion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A partial heat treatment method in a salt bath at low temperature, suitable for use in hardening a surface of chromium-containing iron as a workpiece through heat treatment, comprising:
   primarily plating the surface of the workpiece with a first metal layer using copper or tin;
   secondarily plating a surface of the first metal layer with a second metal layer using nickel or chromium;
   partially peeling the first metal layer and the second metal layer, thus exposing a portion of the surface of the workpiece;
   heat treating the workpiece by immersion in a molten salt solution at 400 to 500° C. for a predetermined period of time; and
   totally peeling the first metal layer and the second metal layer remaining on the surface of the workpiece.

2. The method of claim 1, wherein the totally peeling is performed by immersing the workpiece in a mixture of hydrochloric acid and nitric acid.

3. The method of claim 1, wherein the heat treatment is nitriding treatment.

4. The method of claim 3, wherein the molten salt solution comprises a nitrogen compound, sodium, potassium and lithium.

5. The method of claim 1, wherein the heat treatment is immersion treatment in a molten salt solution including a nitrogen and carbon compound.

6. The method of claim 5, wherein the molten salt solution comprises a nitrogen and carbon compound, sodium, potassium and lithium.

7. The method of claim 1, wherein the first metal layer has a thickness ranging from 15 μm to 50 μm.

8. The method of claim 1, wherein the predetermined period of time ranges from 24 hr to 48 hr.

9. The method of claim 1, wherein the workpiece is a ferrule for sealing a gap between pipes to be connected.

10. The method of claim 9, wherein the ferrule includes a nose portion for sealing the pipes through irreversible transformation, and a surface of the nose portion is exposed in the partially peeling.

* * * * *